Sept. 27, 1932. H. A. JONES 1,879,805
COMPENSATING GAUGE DEVICE FOR LIQUID STORAGE TANKS
Filed Jan. 4, 1930
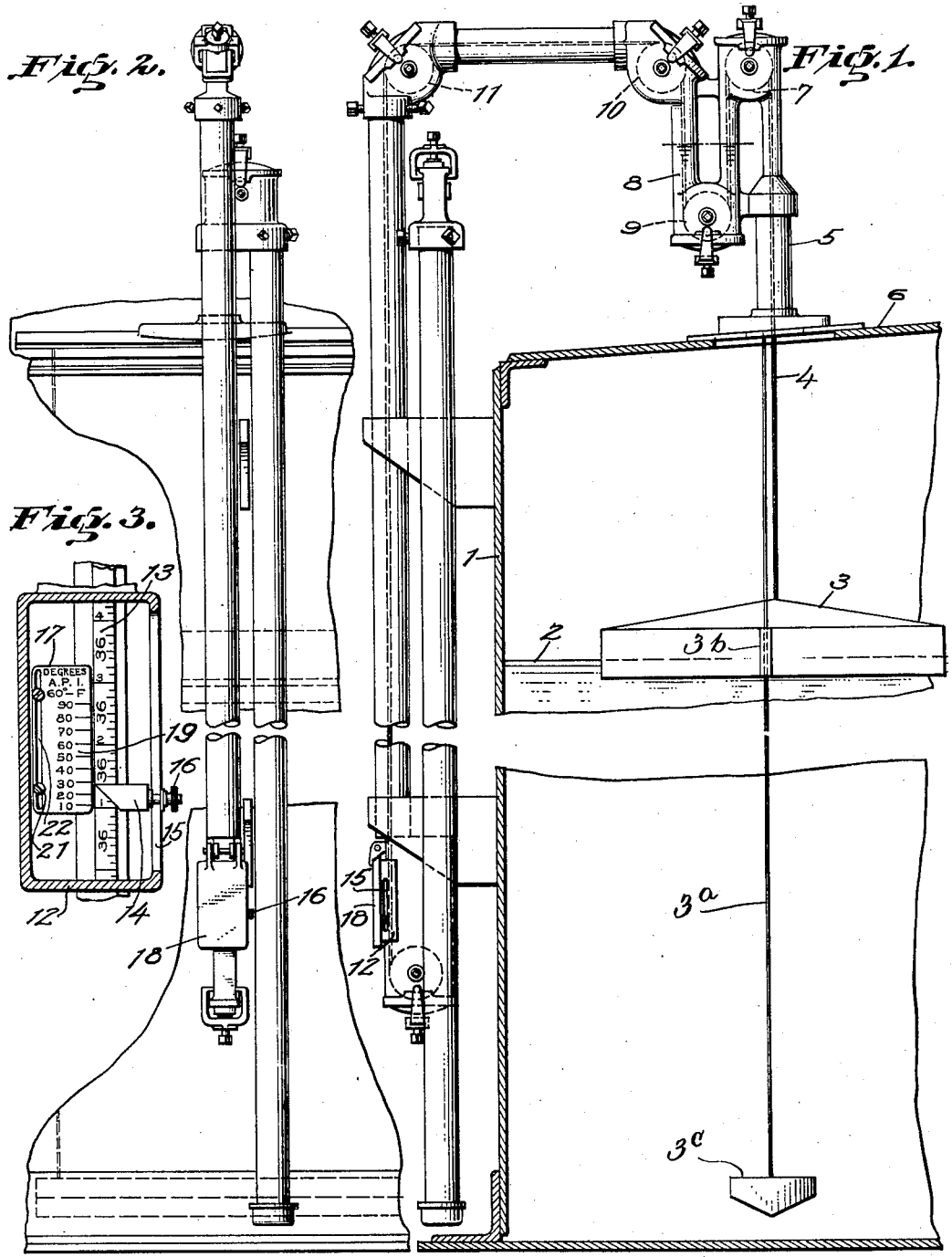

Patented Sept. 27, 1932

1,879,805

UNITED STATES PATENT OFFICE

HENRY ALBERT JONES, OF LYNWOOD, CALIFORNIA, ASSIGNOR TO FRANK V. LONG, TRUSTEE, OF COMPTON, CALIFORNIA

COMPENSATING GAUGE DEVICE FOR LIQUID STORAGE TANKS

Application filed January 4, 1930. Serial No. 418,550.

This invention relates to a gauge, and while features of the invention may be employed in gauges for various purposes, the invention is particularly applicable when employed in the construction of a compensating gauge device for use in gauging the depth of liquids of different specific gravities when held in storage tanks. Where liquids of varying specific gravities, such as different grades of petroleum or other liquids are held in storage tanks, it is common to employ gauges for measuring the depth of the liquid in the tank. These gauges are usually controlled by a float floating on the liquid. If the scale gives a correct reading for a certain specific gravity, it is obvious that if a liquid of different specific gravity is in the tank, the gauge will not give a correct reading. In a tank having a relatively large horizontal cross section or area, the inaccuracy in the reading of the scale becomes important.

The general object of this invention is to provide a gauge which can be employed in connection with tanks carrying liquids of different specific gravities, and constructed so that the gauge will give an accurate reading when measuring the different liquids that may be from time to time held in the tank.

The invention consists of the novel parts and combination of parts to be described hereinafter, all of which contribute to produce an efficient compensating gauge device for liquid storage tanks.

A preferred embodiment of the invention is described in the following specification, while the broad scope of the invention is pointed out in the appended claims.

In the drawing:

Fig. 1 is a vertical section through the side wall of a tank, and illustrating an embodiment of the invention as applied to a gauge of common type and employing a float that rises and falls with the level of liquid in the tank; the middle portion of this view is broken away.

Fig. 2 is a side elevation of the apparatus shown in Fig. 1, certain parts being broken away.

Fig. 3 is a vertical section through the gauge box immediately back of its cover, and further illustrating details of the invention.

Referring more particularly to the parts, 1 represents a tank of any common construction which is employed to carry liquids in storage, and which may have different specific gravities. In this view, 2 indicates the level of the liquid. In practicing my invention, I provide a measuring device having a scale mounted to move to correspond with the rise and fall of the liquid level 2. Associated with this measuring scale I provide a compensator scale which is graduated to correspond with liquids of different specific gravity which may be confined from time to time in the tank, and cooperating with the compensating scale I provide a pointer which may be set at any of the graduations on the compensator scale. When so set, this indicating pointer will give a correct reading on the measuring scale for a liquid having the indicated specific gravity.

Referring again to Fig. 1, it will be evident that with a given liquid level such as indicated by the line 2, if the tank were filled to this level with a liquid of different specific gravity, a float 3 floating on the liquid would displace a different amount of the liquid and consequently any measuring scale controlled by the float would give an inaccurate reading.

My invention may be applied with any kind of gauge employing a measuring scale, the position of which varies with a variable factor such as the specific gravity of a liquid held in a tank. In Figs. 1 and 2 I illustrate a common type of gauge apparatus in which the float 3 is supported on a measuring line or tape 4 that extends up through a suitable fitting 5 mounted on the roof 6 of the tank. Above this fitting 5 the line or tape is guided around a guide pulley 7 and thence down through a liquid trap 8 having a guide pulley 9 at its bottom. Beyond the guide pulley 9 the tape passes upwardly over a guide pulley 10, and thence in a horizontal direction so as to pass around another guide pulley 11, from which the tape passes downwardly and through a gauge box 12. With this construction, it will be evident that if the float 3 rises and falls with changes in the liquid level 2, the tape 12 will move to and fro, that is, up and down through the gauge box. This tape is provided with a measuring scale 13 of sufficient length to accommodate all possible depths of liquid in the tank.

Cooperating with the measuring scale 13 I provide a relatively fixed pointer 14. This pointer is preferably mounted so that it is guided longitudinally on the gauge box. For example, it may be mounted to slide along in a vertical slot 15 in the side wall of the box, and is preferably provided with means such as a clamping screw 16 for securing it in any desired position. This pointer 14 is for indicating the point at which the reading on the scale 13 should be taken.

If only one kind of liquid is to be gauged in this tank, that is to say, if the liquid to be measured is always of the same specific gravity, the pointer 14 would be set once to give a correct reading for any given depth, and of course, after that all the readings on this scale would be accurate. However, if the tank is employed for containing liquids of different specific gravities, the indications of the scale 13 would give inaccurate information as to the depth of the liquid in the tank. In order to overcome this difficulty, I provide a compensator plate 17 which is mounted alongside of the measuring scale 13 of the measuring line, and preferably inside of the gauge box 12, so that the same will be in full view when the hinged cover 18 of the gauge box is raised. This compensator plate carries a scale 19 on its edge adjacent to the edge of the scale 13, and this scale carries numbers indicating different specific gravities according to any system, for example, Baumé or the A. P. I. scale as indicated in the drawing.

If the tank is to measure a liquid having a specific gravity of 30 on the scale 19, then the pointer 14 would be adjusted so that its point is opposite the "30" division on the scale 19, as indicated in Fig. 3. When so placed the reading on the scale 13 will indicate correctly liquid now carried in the tank.

If it becomes necessary to confine a liquid of different specific gravity, the pointer 14 would be adjusted along its slot 15 so as to bring it opposite any other point on the scale corresponding to the particular gravity of the liquid now carried in the tank.

In order to facilitate the mounting of the compensator plate so that its scale 19 will give accurate readings, I prefer to provide the plate with a vertical slot 22 with which two set screws 21 cooperate to enable the plate to be readily adjusted up or down and held fixed in any desired position.

As the float 3 rises and falls with the level 2 of the liquid in the tank, it is guided by means of two guide-cords or wires 3ª that pass, respectively, through guide sleeves 3ᵇ at the side of the float.

These wires are kept taut by means of a weight in the form of a bar 3ᶜ which is suspended from their lower ends. The lower end of this weight 3 may be attached to the usual static eliminator, not illustrated.

It is understood that the embodiment of the invention described herein is only one of the many embodiments this invention may take, and I do not wish to be limited in the practice of the invention, nor in the claims, to the particular embodiment set forth.

I claim:

1. In a compensating gauge for a tank, to indicate the depth of liquids of different specific gravity, the combination of a measuring member, means for supporting the measuring member to permit it to move to and fro, means controlled by the liquid level and connected with the measuring member for moving the same to and fro, a relatively fixed pointer to cooperate with the measuring member, said pointer capable of being moved up and down to set it at different levels, and a compensator plate having a compensating scale extending alongside of said measuring member and adjacent the indicating pointer, said compensator scale having graduations corresponding to different specific gravities of liquids and indicating the point at which the said indicating pointer should be set to give a correct reading for the gauge for any particular specific gravity of liquid in the tank.

2. In a compensating gauge for a tank, to indicate the depth of liquids of different specific gravity, the combination of a float resting on the liquid so as to rise and fall with the level thereof, a measuring line carrying a measuring scale means connecting the measuring line with the float and for guiding the line so as to move the same up or down when the float moves up or down, a relatively fixed pointer to cooperate with the scale, said pointer capable of being moved up and down to set it at different levels, and a compensator plate having a compensating scale extending longitudinally with the said scale adjacent the indicating pointer, said compensator scale having graduations corresponding to different specific gravities of liquid and indicating the point at which the said indicating pointer is to be set to give a correct reading for the gauge to correspond with any particular specific gravity of the liquid in the tank.

3. In a compensating gauge for a tank, to indicate the depth of liquids of different specific gravity, the combination of a float resting on the liquid so as to rise and fall with the level thereof, a measuring line carrying a measuring scale, means connecting the measuring line with the float and for guiding the measuring line so that it will rise and fall when the float moves up or down, a relatively fixed pointer to cooperate with the scale, said pointer capable of being moved up and down to set it at different levels, a compensator plate having a compensating scale extending longitudinally with the said scale adjacent the indicating pointer, said compensator scale having graduations corresponding to different specific gravities of liquid and indicating the point at which the said indicating pointer is to be set to give a correct reading for the gauge to correspond with any particular specific gravity of the liquid in the tank, and means for holding the compensator plate in a different relation along the side of the scale of the measuring line.

4. In a compensating gauge for a tank, to indicate the depth of liquids of different specific gravity, the combination of a float resting on the liquid so as to rise and fall with the level thereof, a measuring line carrying a measuring scale, means connecting the measuring line with the float and for guiding the line so as to be moved up or down when the float moves up or down, a relatively fixed pointer to cooperate with the scale, said pointer capable of being moved up and down to set it at different levels, and a compensator plate having a compensating scale extending longitudinally with the said scale adjacent the indicating pointer, said compensator scale having graduations corresponding to different specific gravities of liquid and indicating the point at which the said indicating pointer is to be set to give a correct reading for the gauge to correspond with any particular specific gravity of the liquid in the tank, and means for guiding the said pointer longitudinally along the path of the measuring scale and for holding the same fixed in different positions.

Signed at Los Angeles, Calif., this 16th day of December, 1929.

HENRY ALBERT JONES.